US012773659B2

(12) United States Patent
Wu

(10) Patent No.: US 12,773,659 B2
(45) Date of Patent: Oct. 27, 2026

(54) GAS PATH CONTROL STRUCTURE OF OXYGEN GENERATOR WITH NITROGEN DISCHARGE AND GAS PATH CONTROL STRUCTURE OF OXYGEN GENERATOR INTEGRATING NITROGEN DISCHARGE AND PRESSURE EQUALIZATION

(71) Applicant: Nanjing Mooxygen Medical Technology Co., Ltd., Nanjing (CN)

(72) Inventor: Ji Wu, Nanjing (CN)

(73) Assignee: Nanjing Mooxygen Medical Technology Co., Ltd., Nanjing (CN)

( * ) Notice: Subject to any disclaimer, the term of this patent is extended or adjusted under 35 U.S.C. 154(b) by 7 days.

(21) Appl. No.: 19/078,381

(22) Filed: Mar. 13, 2025

(65) Prior Publication Data

US 2025/0205633 A1 Jun. 26, 2025

Related U.S. Application Data

(63) Continuation of application No. PCT/CN2024/133419, filed on Nov. 21, 2024.

(30) Foreign Application Priority Data

Nov. 23, 2023 (CN) ......................... 202323159536.1
Nov. 28, 2023 (CN) ......................... 202323207149.0

(51) Int. Cl.
*B01D 53/04* (2006.01)

(52) U.S. Cl.
CPC ...... *B01D 53/0446* (2013.01); *B01D 2256/12* (2013.01); *B01D 2257/102* (2013.01)

(58) Field of Classification Search
CPC ............ B01D 53/0446; B01D 2256/12; B01D 2257/102
See application file for complete search history.

(56) References Cited

U.S. PATENT DOCUMENTS

2020/0016605 A1* 1/2020 Nebrigac ............... B01D 53/04

FOREIGN PATENT DOCUMENTS

CN 208619767 U 3/2019
CN 214367925 U 10/2021
CN 215980939 U 3/2022
(Continued)

OTHER PUBLICATIONS

Notice of granting patent right for utility model dated Jul. 8, 2024 in SIPO application No. 202323159536.1.
(Continued)

*Primary Examiner* — P. Macade Nichols
(74) *Attorney, Agent, or Firm* — Pilloff Passino & Cosenza LLP; Rachel K. Pilloff; Sean A. Passino

(57) ABSTRACT

A gas path control structure of an oxygen generator with nitrogen discharge and a gas path control structure of an oxygen generator integrating nitrogen discharge and pressure equalization are provided. The gas path control structure of an oxygen generator with nitrogen discharge includes a blowback valve seat, two check valves, a pulse valve seat and two solenoid valves. The gas path control structure of an oxygen generator integrating nitrogen discharge and pressure equalization includes a pulse valve seat, check valves, a blowback valve seat, a solenoid valve, an equalizing valve and a check valve seat.

10 Claims, 8 Drawing Sheets

(56) References Cited

FOREIGN PATENT DOCUMENTS

| | | | |
|---|---|---|---|
| CN | 218741191 | U | 3/2023 |
| CN | 218834050 | U | 4/2023 |
| CN | 219912688 | U | 10/2023 |
| CN | 221258562 | U | 7/2024 |
| CN | 221483374 | U | 8/2024 |
| KR | 20130087333 | A | 8/2013 |

OTHER PUBLICATIONS

Notice of granting patent right for utility model dated May 9, 2024 in SIPO application No. 202323207149.0.
International Search Report dated Jan. 24, 2025 in PCT/CN2024/133419.

* cited by examiner

GAS PATH CONTROL STRUCTURE OF OXYGEN GENERATOR WITH NITROGEN DISCHARGE AND GAS PATH CONTROL STRUCTURE OF OXYGEN GENERATOR INTEGRATING NITROGEN DISCHARGE AND PRESSURE EQUALIZATION

CROSS-REFERENCE TO RELATED APPLICATIONS

This application is a continuation of PCT/CN2024/133419, filed Nov. 21, 2024, and claims priorities of Chinese Patent Application No. 202323159536.1, filed on Nov. 23, 2023, and Chinese Patent Application No. 202323207149.0, filed on Nov. 28, 2023, the entire contents of which are incorporated herein by reference.

TECHNICAL FIELD

The present disclosure relates to oxygen generators, in particular to a gas path control structure of an oxygen generator with nitrogen discharge and a gas path control structure of an oxygen generator integrating nitrogen discharge and pressure equalization.

BACKGROUND

An oxygen generator is a kind of machine to produce oxygen, it uses air separation technology to separate the various components in the air. Small oxygen generators often utilize the adsorption performance of molecular sieves to separate the nitrogen and oxygen in the air, and ultimately obtaining high-concentration oxygen is obtained.

In the process of oxygen production of the oxygen generator, the molecular sieve needs to be continuously blown back. In the existing technology, the backflushing interface is often realized through a restrictor valve, and oxygen is continuously blown back to the other sieve cylinder through the restrictor valve for nitrogen discharge. However, the time of nitrogen discharge cannot be precisely controlled, and there is no pressure equalization function, and it will also cause oxygen waste.

SUMMARY

An objective of the disclosure is to provide a gas path control structure of an oxygen generator with nitrogen discharge and a gas path control structure of an oxygen generator integrating nitrogen discharge and pressure equalization, so as to solve the problems of the prior art.

To achieve the above objective, the present disclosure provides a gas path control structure of an oxygen generator with nitrogen discharge, including a blowback valve seat, two check valves, a pulse valve seat and two solenoid valves. Each of the blowback valve seat and pulse valve seat is provided with two paths, the two check valves are mounted on the two paths of the pulse valve seat respectively, the blowback valve seat is in a sealing connection with the pulse valve seat through the check valves, and the solenoid valves are respectively mounted on the blowback valve seat and pulse valve seat.

Further, the check valves are fixed on the pulse valve seat by screws.

Further, one of the two solenoid valves is arranged on one side surface of the blowback valve seat.

Further, two blowback air holes are provided on the side surface of the blowback valve seat, one end of each of the two blowback air holes is in communication with a corresponding one of the two paths of the blowback valve seat, and another end of each of the two blowback air holes is connected to the one of the two solenoid valves.

Further, another of the two solenoid valves is arranged at a bottom of the pulse valve seat.

Further, the two paths of the pulse valve seat are in communication with each other by a connecting hole, the connecting hole is provided between the two paths of the pulse valve seat, one of the two paths of the pulse valve seat is provided with a block, the pulse valve seat is provided with two pulse air holes, one end of each of the pulse air holes is in communication with a corresponding one of the two paths of the pulse valve seat, and another end of each of the pulse air holes is connected to the other of the two solenoid valves.

The present disclosure further provides a gas path control structure of an oxygen generator integrating nitrogen discharge and pressure equalization, which includes a blowback valve seat, two check valves, a pulse valve seat, a solenoid valve, an equalizing valve and a check valve seat, the check valve seat is provided on one side of the blowback valve seat, the two check valves are arranged in the check valve seat, each of the blowback valve seat and pulse valve seat is provided with two paths, the check valves are correspondingly arranged at sides of the two paths of the blowback valve seat, and the solenoid valve and the equalizing valve are provided on one side surface of the blowback valve seat.

Further, silicone sealing rings are respectively mounted between the pulse valve seat, the blowback valve seat and the check valve seat.

Further, the blowback valve seat is provided with two gas main pipes, the two gas main pipes are in communication with two inlet ports of the blowback valve seat respectively, the two gas main pipes are respectively connected to two exhaust pipes, and the two exhaust pipes are respectively connected to inlets of the two check valves.

Further, the two gas main pipes are respectively connected to ends of two nitrogen discharge pipes, and the other ends of the two nitrogen discharge pipes are arranged on an interface side of the solenoid valve.

Further, the two gas main pipes are respectively connected to ends of two equalizing pipes, and other ends of the two equalizing pipes are arranged on an interface side of the equalizing valve.

Further, a jet valve is arranged on a side of the two paths of the pulse valve seat.

Compared with the prior art, the disclosure has the following effects.

The present disclosure has the following technical effects. By arranging solenoid valves on both the blowback valve seat and the pulse valve seat, it can not only precisely control the nitrogen discharge time, save the oxygen consumption during nitrogen discharge and improve the oxygen production efficiency of molecular sieve, but also output the oxygen through the solenoid valves in a pulsed manner, which is very practical. Moreover, the equalizing valve is used for the nitrogen discharge and pressure equalization, and the overall layout is reasonable and compact, with higher integration, space utilization is improved and costs is reduced.

BRIEF DESCRIPTION OF THE DRAWINGS

In order to more clearly illustrate the technical solutions in the embodiments of the present disclosure or the prior art, the drawings to be used in the embodiments will be briefly introduced below. The drawings in the following description are only some of the embodiments of the present disclosure, and that for one of ordinary skill in the art, other drawings can be obtained based on these drawings without creative effort.

DETAILED DESCRIPTION OF THE EMBODIMENTS

Figure 1:
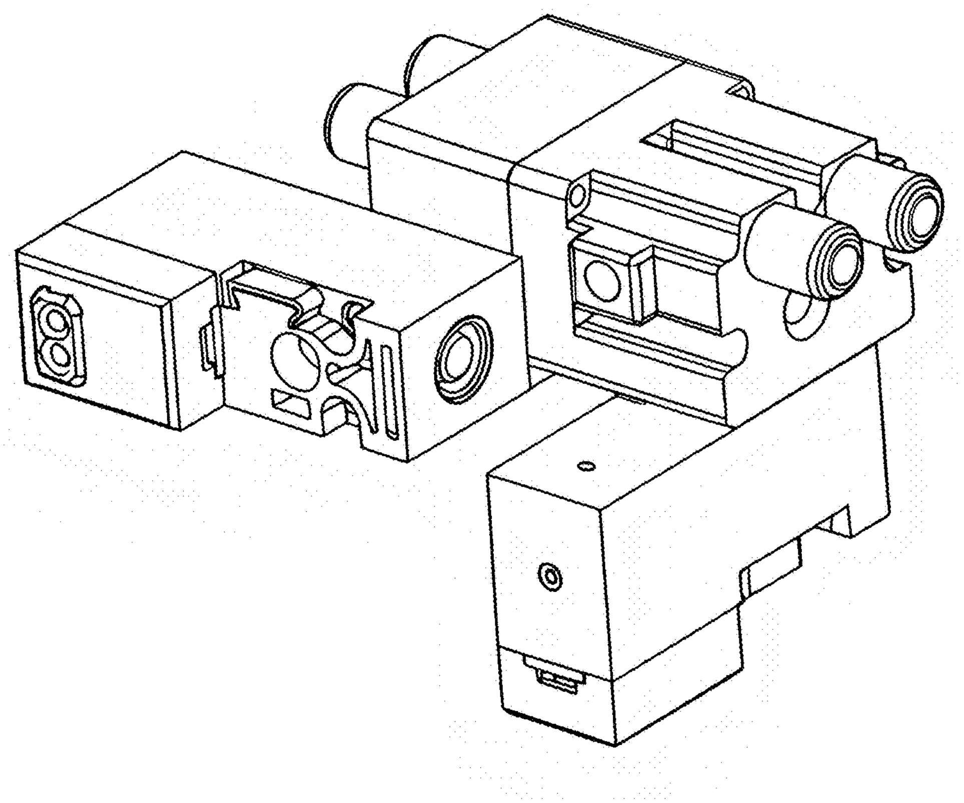
FIG. 1 is a schematic structural diagram of Embodiment 1.
Figure 2:
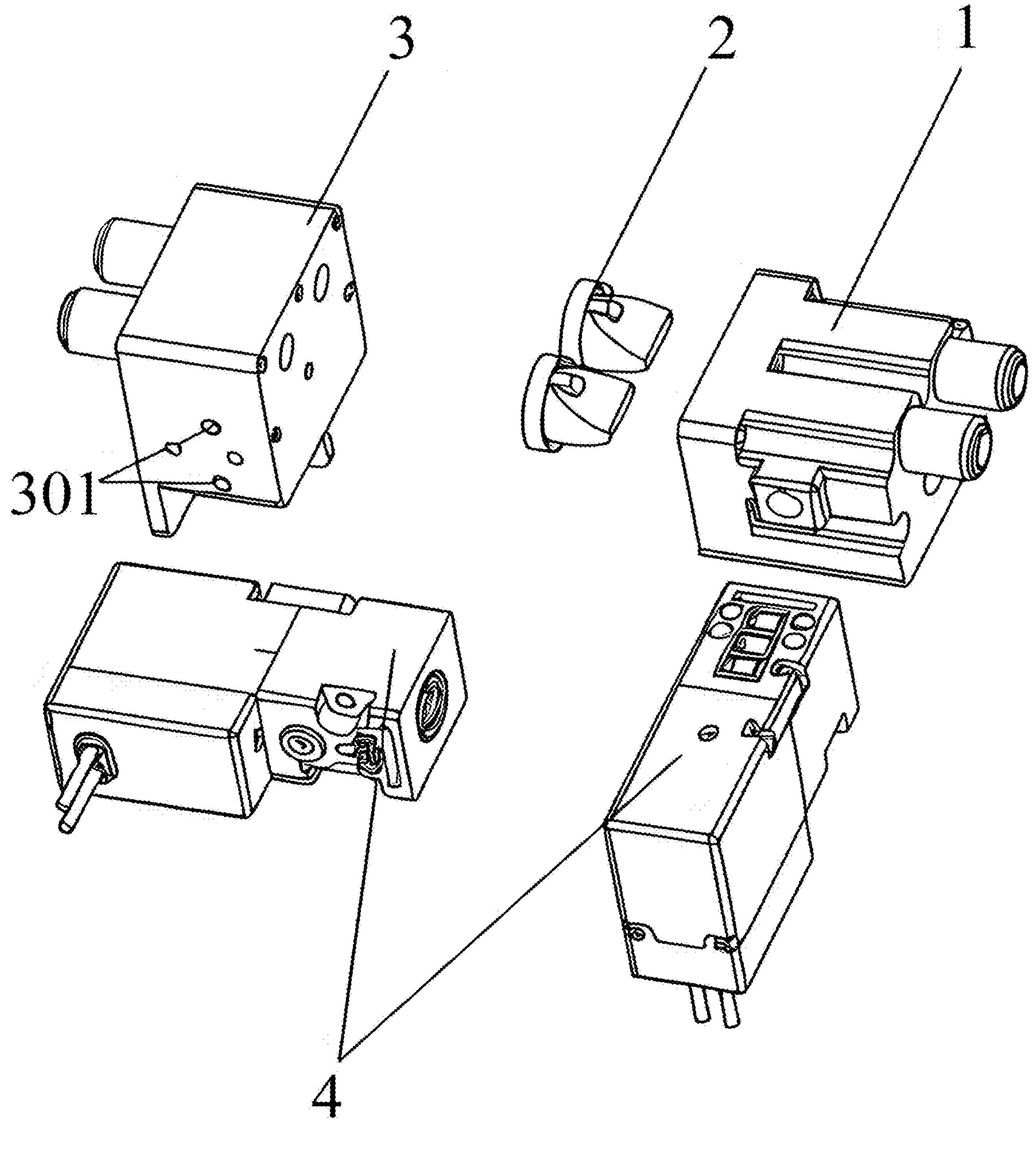
FIG. 2 is an exploded schematic structural diagram of Embodiment 1.
Figure 3:
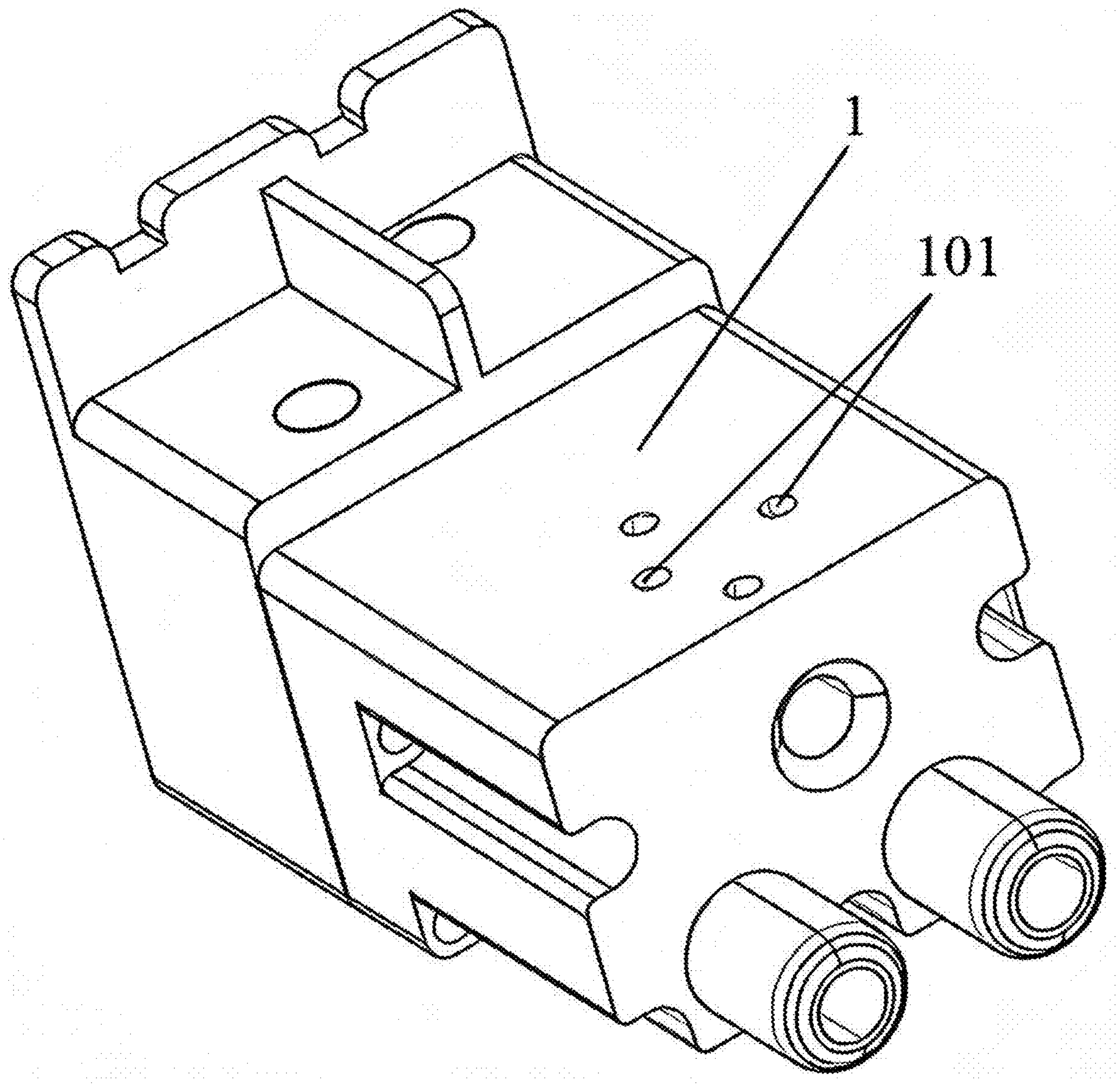
FIG. 3 is a schematic structural diagram of a pulse valve seat of Embodiment 1.
Figure 4:
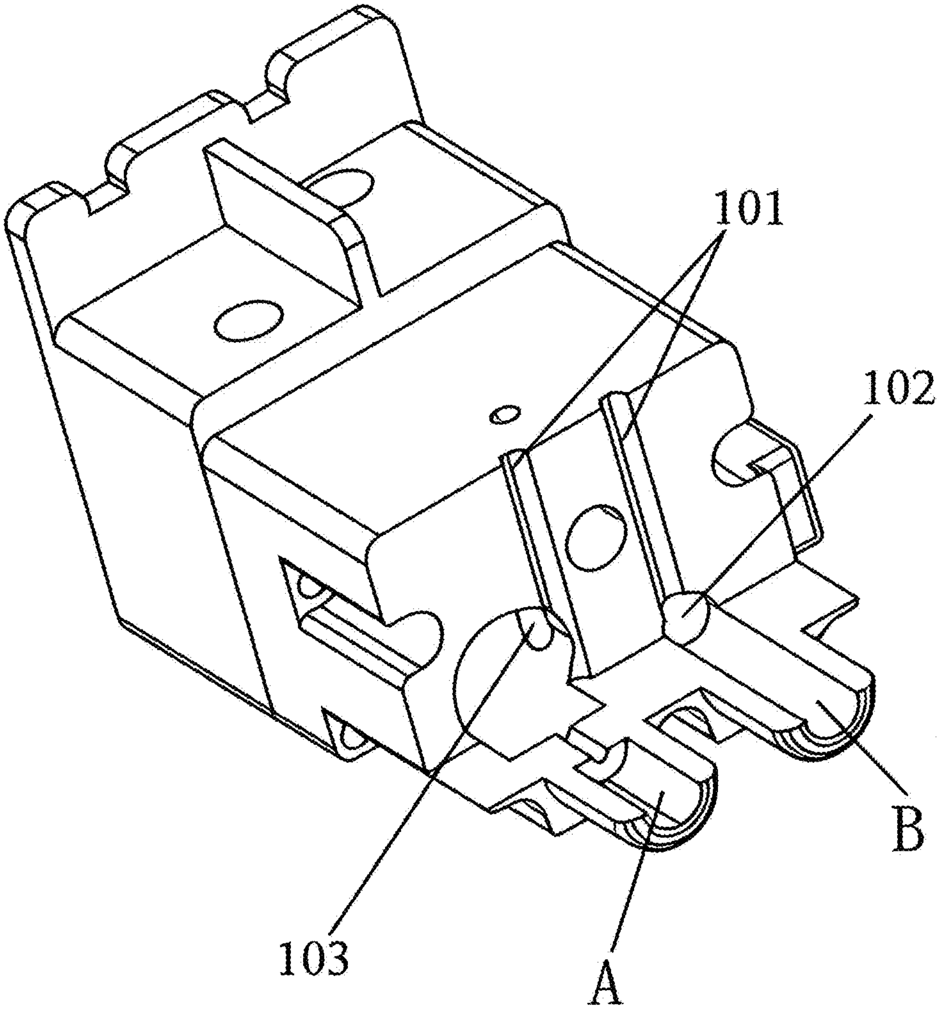
FIG. 4 is a schematic diagram of a partial sectional structure of the pulse valve seat of Embodiment 1.

In the following, the technical solutions in the embodiments of the present disclosure will be clearly and completely described with reference to the attached drawings. Apparently, the described embodiments are only a part of the embodiments of the present disclosure, but not all the embodiments. Based on the embodiments in the present disclosure, all other embodiments obtained by one of ordinary skill in the art without creative effort belong to the protection scope of the present disclosure.

In order to make the above objectives, features and advantages of the present disclosure more clearer and understandable, the present disclosure will be further described in detail with the attached drawings and specific embodiments

Embodiment 1

As shown in FIG. 1 to FIG. 4, the present disclosure provides a gas path control structure of an oxygen generator with nitrogen discharge, which includes a blowback valve seat 3, two check valves 2, a pulse valve seat 1 and two solenoid valves 4. The blowback valve seat 3 and pulse valve seat 1 are each provided with two paths, two oxygen sieve cylinders are respectively connected to the left ends of the two paths of the blowback valve seat 3. The two check valves 2 are mounted on the two paths of the pulse valve seat 1 respectively, and are fixed by the screws. The blowback valve seat 3 is in a sealing connection with the pulse valve seat 1 through the check valves 2. The right ends of the two paths of the pulse valve seat 1 are connected respectively to a gas storage tank and an oxygen outlet nozzle, and the two solenoid valves 4 are respectively mounted on the blowback valve seat 3 and pulse valve seat 1.

In the embodiment, one solenoid valve 4 is arranged on one side surface of the blowback valve seat 3, the output port of the solenoid valve 4 is connected to two blowback air holes 301 on the side surface of the blowback valve seat 3. Ends of the two blowback air holes 301 are respectively connected to the two paths of the blowback valve seat 3, the solenoid valve 4 is connected to the two blowback air holes 301, and the on-off of the two blowback air holes 301 is controlled by the solenoid valve 4. When the solenoid valve 4 is opened, the oxygen in the oxygen sieve cylinder on one side can enter the oxygen sieve cylinder on the other side through the blowback air holes 301 controlled by the solenoid valve 4 to for blowback nitrogen discharge.

Figure 5:
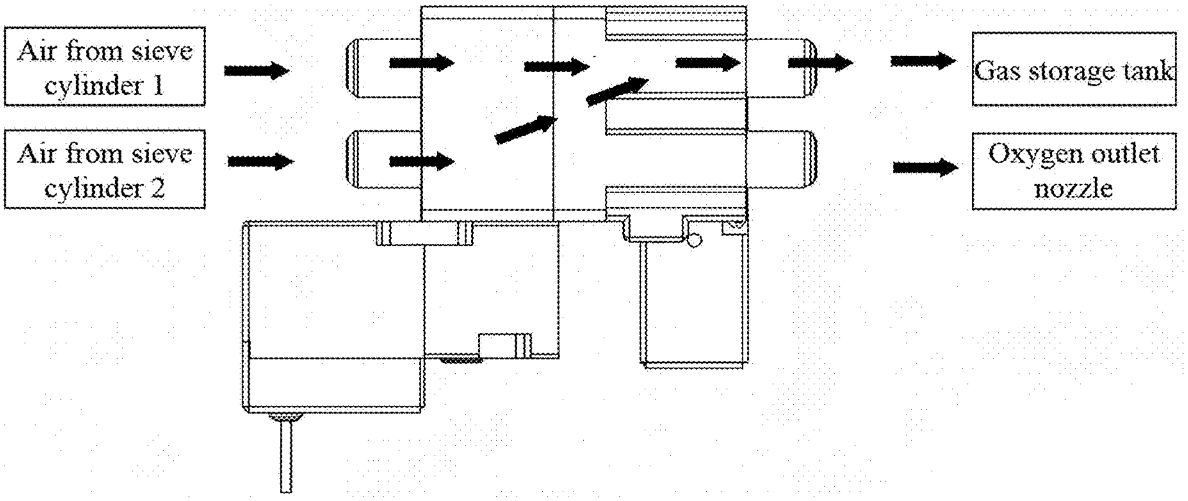
FIG. 5 is a schematic diagram of the intake air flow of Embodiment 1.

In the embodiment, as shown in FIG. 5, the other solenoid valve 4 is arranged at the bottom of the pulse valve seat 1. The two paths of the pulse valve seat 1 are connected by a connecting hole 103 between the two paths, one path of the pulse valve seat 1 is provided with a block 102, so that oxygen entering the pulse valve seat 1 from two paths of the blowback valve seat 3 can only be discharged from port A, and the port A is connected to the gas storage tank, thereby allowing oxygen to enter the gas storage tank. The pulse valve seat 1 is provided with two pulse air holes 101, ends of the two pulse air holes 101 are respectively connected to the paths of the pulse valve seat 1, and the other ends of two pulse air holes 101 are connected to the solenoid valve 4. The port B is connected to the oxygen outlet nozzle, and the solenoid valve 4 connects the two pulse air holes 101 so that oxygen can be discharged from the port B, and by controlling the on-off frequency of the solenoid valve 4, the oxygen is discharged from the oxygen outlet nozzle in a pulsed manner.

Embodiment 2

Figure 6:
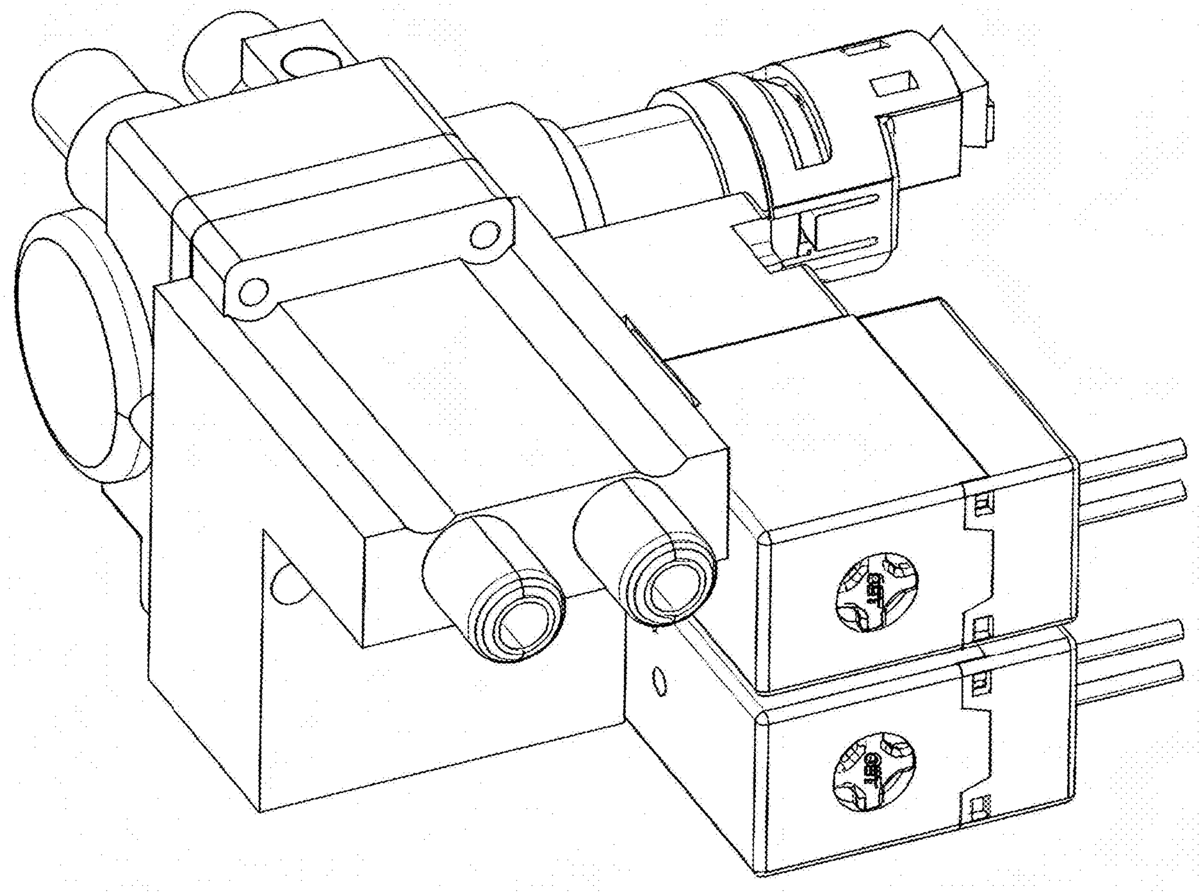
FIG. 6 is a schematic structural diagram of Embodiment 2.
Figure 7:
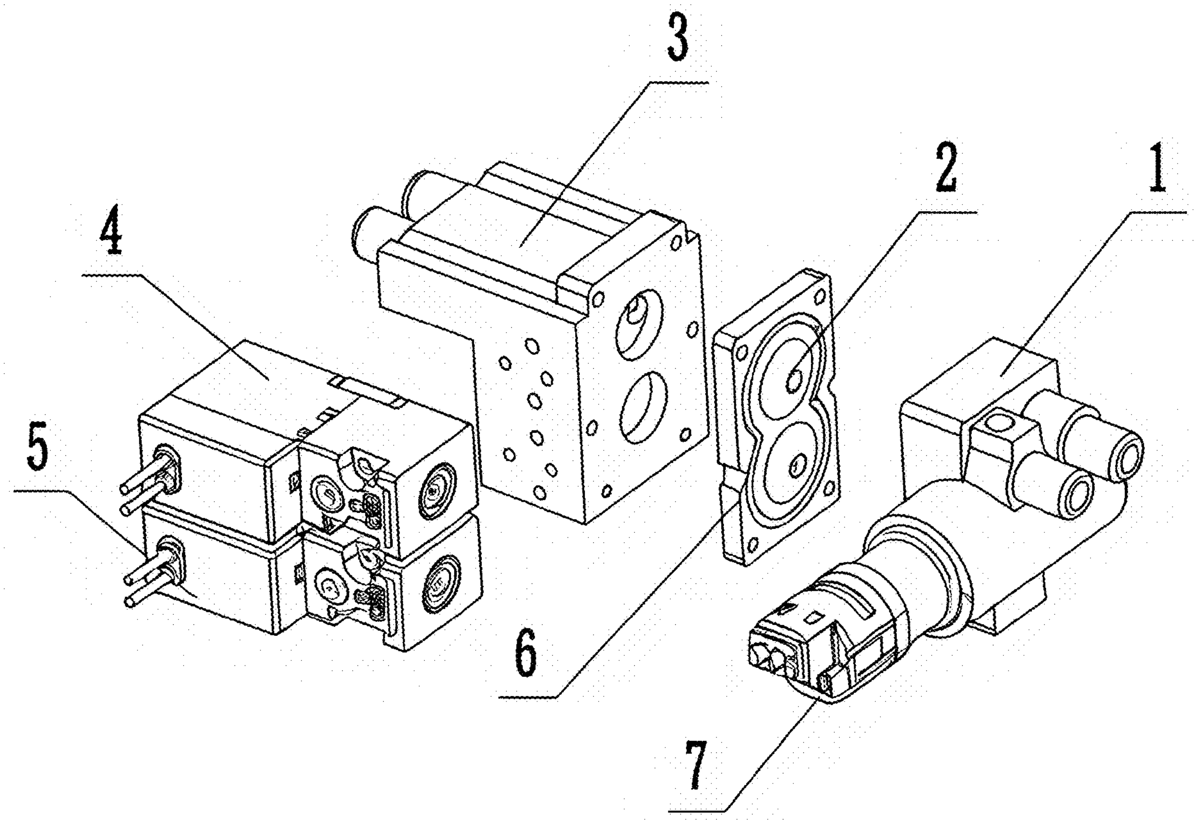
FIG. 7 is an exploded schematic structural diagram of Embodiment 2.

As shown in FIG. 6 to FIG. 7, the present disclosure provides a gas path control structure of an oxygen generator integrating nitrogen discharge and pressure equalization, including a pulse valve seat 1, check valves 2, a blowback valve seat 3, a solenoid valve 4, an equalizing valve 5 and a check valve seat 6 and a jet valve 7. The check valve seat 6 is provided on one side of the blowback valve seat 3, the check valve seat 6 is provided with the two check valves 2, the blowback valve seat 3 and pulse valve seat 1 are each provided with two paths, the check valves 2 are correspondingly arranged at the sides of the two paths of the blowback valve seat 3, and the jet valve 7 is arranged on the side of the two paths of the pulse valve seat 1. Silicone sealing rings are respectively mounted between the pulse valve seat 1, the blowback valve seat 3 and the check valve seat 6. The solenoid valve 4 and the equalizing valve 5 are provided on one side surface of the blowback valve seat 3.

Figure 8:
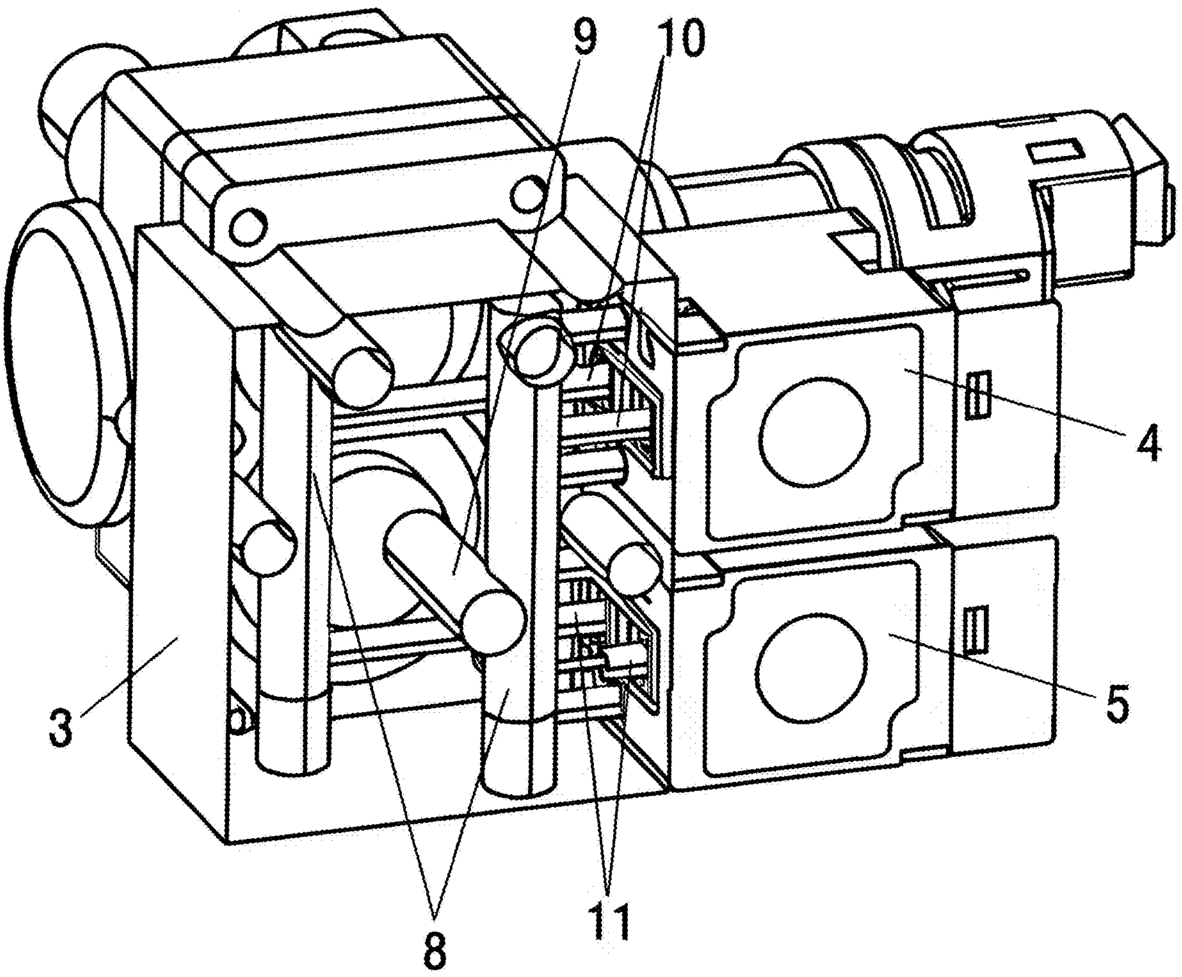
FIG. 8 is a schematic diagram of a sectional structure of Embodiment 2.

As shown in FIG. 8, the blowback valve seat 3 is provided with two gas main pipes 8, the two gas main pipes 8 are in communication with two inlet ports of the blowback valve seat 3 respectively, the two gas main pipes 8 are also respectively connected to two exhaust pipes 9, and the two exhaust pipes 9 are connected to inlets of the check valves 2 respectively. The oxygen entering from the inlet port of the blowback valve seat 3 passes through the gas main pipes 8 and enters the check valves 2 through the exhaust pipes 9.

The two gas main pipes 8 are connected to ends of two nitrogen discharge pipes 10 respectively, and the other ends of the two nitrogen discharge pipes 10 are provided on an interface side of the solenoid valve 4. The solenoid valve 4 controls the flow of oxygen from the nitrogen discharge pipe 10 on one side to the nitrogen discharge pipe 10 on the other side, so as to realize the blowback nitrogen discharge.

The two gas main pipes 8 are connected to ends of the two equalizing pipes 11 respectively, and the other ends of the two equalizing pipes 11 are provided on an interface side of the equalizing valve 5, so that the function of equalizing pressure is realized through the control of the equalizing valve 5.

During the use of the gas path control structure of the oxygen generator integrating nitrogen discharge and pressure equalization is put into use, oxygen from the sieve cylinder enters through one inlet port of the blowback valve seat 3 and enters into the pulse valve seat 1 through the check valve 2. By controlling the closing and opening of the jet valve 7, oxygen is output in a pulsed manner. When blowback is required, the solenoid valve 4 is opened, and when pressure equalization is required, the equalizing valve 5 is opened.

In the description of the present disclosure, it should be understood that the terms "longitudinal", "transverse", "up", "down", "front", "back", "left", "right", "vertical", "horizontal", "top", "bottom", "inside", "outside", etc. indicate orientation or positional relationships based on the orientation or positional relationships shown in the accompanying drawings, only for the convenience of describing the present disclosure, and do not indicate or imply that the device or element referred to must have a specific orientation, be constructed and operated in a specific orientation, and therefore cannot be understood as a limitation of the present disclosure.

The above-mentioned embodiments only describe the preferred mode of the present disclosure, and do not limit the scope of the present disclosure. Under the premise of not departing from the design spirit of the present disclosure, various modifications and improvements made by one of ordinary skill in the art to the technical solution of the present disclosure should fall within the protection scope of the present disclosure.

What is claimed is:

1. A gas path control structure of an oxygen generator with nitrogen discharge, comprising: a blowback valve seat, two check valves, a pulse valve seat and two solenoid valves; wherein each of the blowback valve seat and pulse valve seat is provided with two paths, the two check valves are respectively mounted on the two paths of the pulse valve seat, the blowback valve seat is in a sealing connection with the pulse valve seat through the check valves, and the solenoid valves are respectively mounted on the blowback valve seat and pulse valve seat; and wherein one of the two solenoid valves is arranged on one side surface of the blowback valve seat.

2. The gas path control structure according to claim 1, wherein two blowback air holes are provided on the side surface of the blowback valve seat, one end of each of the two blowback air holes is in communication with a corresponding one of the two paths of the blowback valve seat, and another end of each of the two blowback air holes is connected to the one of the two solenoid valves.

3. The gas path control structure according to claim 1, wherein another of the two solenoid valves is arranged at a bottom of the pulse valve seat.

4. The gas path control structure according to claim 1, wherein the two paths of the pulse valve seat are in communication with each other by a connecting hole, the connecting hole is provided between the two paths of the pulse valve seat, one of the two paths of the pulse valve seat is provided with a block, the pulse valve seat is provided with two pulse air holes, one end of each of the pulse air holes is in communication with a corresponding one of the two paths of the pulse valve seat, and another end of each of the pulse air holes is connected to the other of the two solenoid valves.

5. A gas path control structure of an oxygen generator integrating nitrogen discharge and pressure equalization, comprising: a blowback valve seat, two check valves, a pulse valve seat, a solenoid valve, an equalizing valve and a check valve seat, wherein the check valve seat is provided on one side of the blowback valve seat, the two check valves are arranged in the check valve seat, each of the blowback valve seat and pulse valve seat is provided with two paths, the check valves are correspondingly arranged at sides of the two paths of the blowback valve seat, and the solenoid valve and the equalizing valve are provided on one side surface of the blowback valve seat.

6. The gas path control structure according to claim 5, wherein silicone sealing rings are respectively mounted between the pulse valve seat, the blowback valve seat and the check valve seat.

7. The gas path control structure according to claim 5, wherein the blowback valve seat is provided with two gas main pipes, the two gas main pipes are in communication with two inlet ports of the blowback valve seat respectively, the two gas main pipes are respectively connected to two exhaust pipes, and the two exhaust pipes are respectively connected to inlets of the two check valves.

8. The gas path control structure according to claim 7, wherein the two gas main pipes are respectively connected to ends of two nitrogen discharge pipes, and other ends of the two nitrogen discharge pipes are arranged on an interface side of the solenoid valve.

9. The gas path control structure according to claim 7, wherein the two gas main pipes are respectively connected to ends of two equalizing pipes, and other ends of the two equalizing pipes are arranged on an interface side of the equalizing valve.

10. The gas path control structure according to claim 5, wherein a jet valve is arranged on a side of the two paths of the pulse valve seat.

* * * * *